United States Patent
Shi et al.

(10) Patent No.: US 9,421,850 B2
(45) Date of Patent: Aug. 23, 2016

(54) FOLDING TONNEAU COVER SYSTEM SECONDARY HINGE ASSEMBLY

(71) Applicants: Hang Shi, Changzhou (CN); Hongjuan Zheng, Changzhou (CN)

(72) Inventors: Hang Shi, Changzhou (CN); Hongjuan Zheng, Changzhou (CN)

( * ) Notice: Subject to any disclaimer, the term of this patent is extended or adjusted under 35 U.S.C. 154(b) by 0 days.

(21) Appl. No.: 14/465,596

(22) Filed: Aug. 21, 2014

(65) Prior Publication Data

US 2015/0054300 A1 Feb. 26, 2015

Related U.S. Application Data

(60) Provisional application No. 61/868,342, filed on Aug. 21, 2013.

(51) Int. Cl.
| | |
|---|---|
| *B60J 7/04* | (2006.01) |
| *B60R 11/00* | (2006.01) |
| *E05D 1/04* | (2006.01) |
| *B60J 7/14* | (2006.01) |

(52) U.S. Cl.
CPC ............ *B60J 7/141* (2013.01); *B60R 11/00* (2013.01); *E05D 1/04* (2013.01); *B60R 2011/004* (2013.01); *B60R 2011/0094* (2013.01)

(58) Field of Classification Search
CPC .... B60J 7/141; B60R 11/00; B60R 2011/004; B60R 2011/0094; E05D 1/04
See application file for complete search history.

(56) References Cited

U.S. PATENT DOCUMENTS

| | | | |
|---|---|---|---|
| 5,636,893 A | 6/1997 | Wheatley et al. | |
| 7,334,830 B2 | 2/2008 | Weldy | |
| 7,484,788 B2 | 2/2009 | Calder et al. | |
| 8,348,328 B2 * | 1/2013 | Walser | B60J 7/141 296/100.09 |

* cited by examiner

*Primary Examiner* — Glenn Dayoan
*Assistant Examiner* — Melissa A Black
(74) *Attorney, Agent, or Firm* — Polsinelli PC

(57) ABSTRACT

A tonneau cover system for a pickup truck cargo bed incorporates hinge assemblies to allow individual panels to open, close or fold over on top of each other. To provide individual compartments within a cargo bed, the main hinge assembly of a foldable tonneau cover system provides for a secondary hinge assembly for the addition of a pivoting lock in place isolation wall.

13 Claims, 7 Drawing Sheets

FOLDING TONNEAU COVER SYSTEM SECONDARY HINGE ASSEMBLY

This application is a non-provisional application which claims priority of U.S. Provisional application Ser. No. 61/868,342, filed Aug. 21, 2013, the entire disclosure of which is herein incorporated by reference.

FIELD of the INVENTION

In general the present invention relates to foldable cargo bed cover but more particularly in regards to a main hinge assembly allowing the incorporation of a secondary hinge assembly to provide pivoting attachment of an isolation wall.

BACKGROUND AND RELATED ART

Tonneau covers have been used for a number of years and used to cover the cargo box of pickup trucks and protect its interior against dirt, debris and other environmental contaminants and in some cases to improve the aesthetic quality thereof. Originally tonneau covers were designed by upholstery shops and typically made of vinyl covered fabrics or canvas. The material was often doubled over along its edges for added strength and appearance. Male snaps were then attached to the sides of the cargo box via fasteners, while female snaps were attached along the edges of the cover. Wooden bows were sometime used to span the cargo box and ensure that the cover remained high enough to drain water. Unfortunately these covers were sometimes difficult to handle, often led to corrosion around the snaps and occasionally failed to protect the cargo box.

Over the years a wide variety of covers designs have been developed, in general these covers are known as either "caps" or "tonneau covers." Caps are typically an enclosure that extends substantially above the bed so as to increase the height of the cargo bed while a tonneau cover typically lies substantially flush with the top walls of the cargo bed without significantly increasing the height of the cargo bed.

Most tonneau cover systems today are constructed of a solid or fabric material and employ an internal support frame work which installs to the cargo bed as a one piece system. Occasionally these systems are hinged to provide an opening section thus providing access to the cargo bed to stowed cargo. Clamp methods are often employed to allow alignment and installation of the cover system to the cargo bed or when on occasions, it may be necessary to carry a load that exceeds the height limitations of the cover system, clamping methods allow quick removal of the cover from the cargo bed.

For example U.S. Pat. No. 5,636,893 discloses tonneau cover comprising of two or more hard panels pivotally connected to one another to fold in an accordion-style fashion, each of said panels having side edges overlying the upper ends of the cargo box side walls.

U.S. Pat. No. 7,334,830 discloses a tonneau cover for the cargo bed of a pickup truck which comprises of three hinge sections and whereas claims; a covering overlaying the first and second sections, and the second section being joined to the first section so as to be moveable between an extended position adjacent to the first section and a folded position overlaying at least part of the first section, wherein the second section is hinged to the first section, the second section is releasably clamped to the pickup truck when in the extended position, and the second section is releasably clamped to the first section when in the folded position, and a third section hinged to the second section, the third section is releasably clamped to the pickup truck when in the extended position, the third section is releasably clamped to the second section when in its folded position, and the second and third sections are releasably clamped to the first section when in their folded positions.

U.S. Pat. No. 7,484,788 discloses a tonneau cover for the bed of a pickup truck comprising three sections with which includes a pivot hinge having plurality of inner surfaces primary used to discourage fluids from entering into the cargo bed.

Patents illustrated disclose sectional hinges utilized for cargo bed covers with each providing improve in design for tonneau cover applications.

SUMMARY OF THE INVENTION

A primary object of the present invention is to provide to a sectional cargo cover, having a primary hinge assembly to which incorporates a secondary hinge to provide foldable attachment for an isolating well structure within a pickup truck cargo bed. As for example, after grocery shopping and placing a series of grocery bags in the cargo bed and if not restrained, upon driving or stopping the groceries can scatter across the cargo bed floor. However, if capable of folding down from the sectional cover, a lock in place divider wall, the groceries could remain contained within a much smaller area, lessening the burden of collection.

Therefore a tonneau system for a cargo bed is provided. The tonneau system includes at least a first and a second panel extending across the cargo bed with a first hinge assembly pivotally connecting the first and second panel together at the hinge base point. Two individual components compose a single hinge panel assembly, a base component stretching across the width of the cargo bed incorporates opposing cylindrical receiving channels in which accepts a smaller in diameter cylindrical pivoting component having attachment to the first and second panels. It is the coupling of a smaller tubular configuration inside a larger cylindrical member in which form the hinge union to provide pivoting points to the sectional frame assembly in which sectional cover panels are attached.

Each pivoting point provides housing to a rubber seal used to inhibited fluid leakage between the base hinge component and each pivoting point. Upon closure of the panels, the rubber seal is compressed against the leading edge of the base hinge component achieving seal between the opening areas of the sectional panels.

Incorporated within each pivoting point, a groove spanning across the length of the pivoting point provides mounting for a secondary hinge in which provides mounting for a foldable solid or flexible wall material. This secondary hinge assembly allows this wall to be folded upward for storage into a hollowed section within the sectional cover panels when not required. When folded in the downward position, it can be locked in place to form an isolated section within the cargo bed.

DESCRIPTION OF THE DRAWINGS

The structure and the technical means adopted by the present invention to achieve the above and other objects can be best understood by referring to the following detailed description of the preferred embodiments and the accompanying drawings, within.

DETAILED DESCRIPTION OF THE PREFERRED EMBODIMENTS

Figure 1:
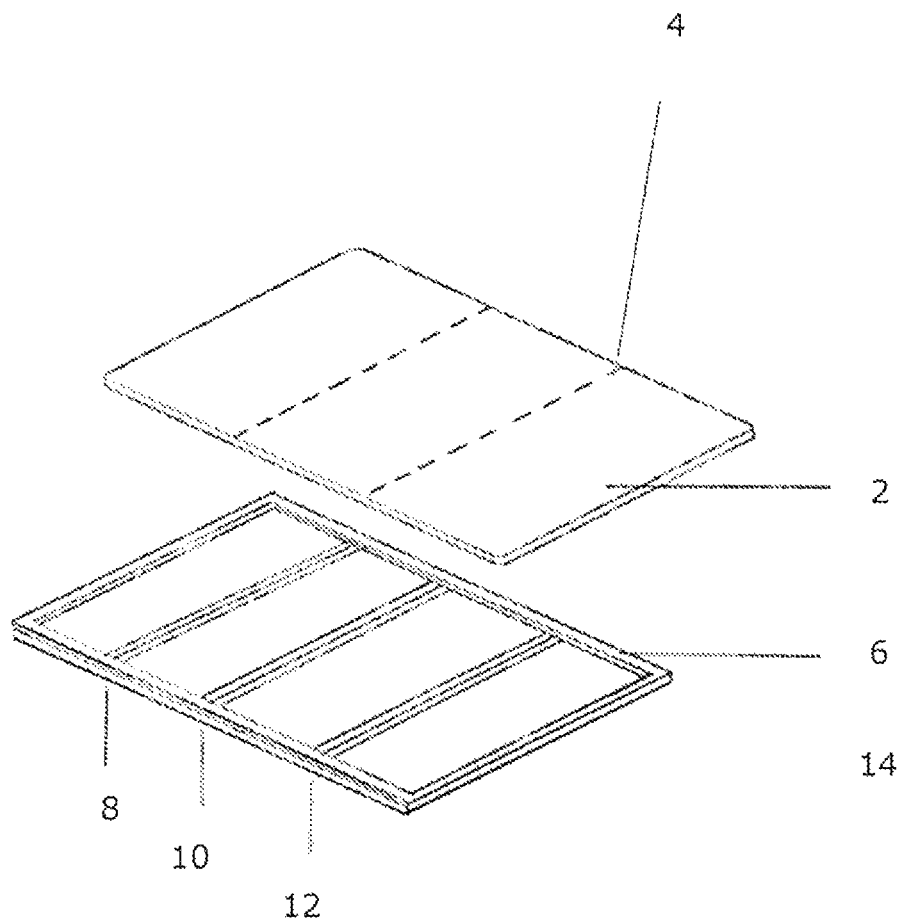
FIG. 1 is an exposed perspective view of tonneau cover components according to the preferred embodiment of the present invention.

In reference to FIG. 1, a tonneau cover according to a preferred embodiment of the present invention is illustrated. As shown, the tonneau cover comprise a flexible cover 2 having at least two foldable panels, 4 and a hinged frame work 6 and having at least three hinge assemblies, 8, 10 and 12. Tonneau covers are used to cover the cargo bed of a pickup truck in which accepts a foldable frame work 6, attached to the cargo bed by using one or more clamp assemblies. The tonneau cover assembly protects cargo within the pickup bed from adverse weather, potential theft or cargo dislodging from the cargo bed while the vehicle is in motion.

In this preferred embodiment, the tonneau cover 2, could be constructed of a flexible material such as a fabric or other equivalent flexible materials or constructed of harder non flexible materials such as fiberglass or plastics. All used materials are constructed as sectional panels 4 and where when joined together form the cover 2. As individual panels, opening or folded over on top of each other becomes possible when attached to a pivotal frame 6 incorporating at least two hinged sections, 8 and 10 which forms the pivoting frame union.

Foldable frame 6 can be constructed or extruded from various materials such metal, (steel, aluminum or an equivalent) or constructed of a plastic or wood. Lateral cross sections 14, span between sectional side rails to provide mounting support for the sectional cover panels 2 and where hinge unions, 8, 10 and 12 connect to allow pivoting of the frame work and the attached sectional panels and where in a closed position, form a rigid frame structure and covering for the cargo bed.

Figure 2:
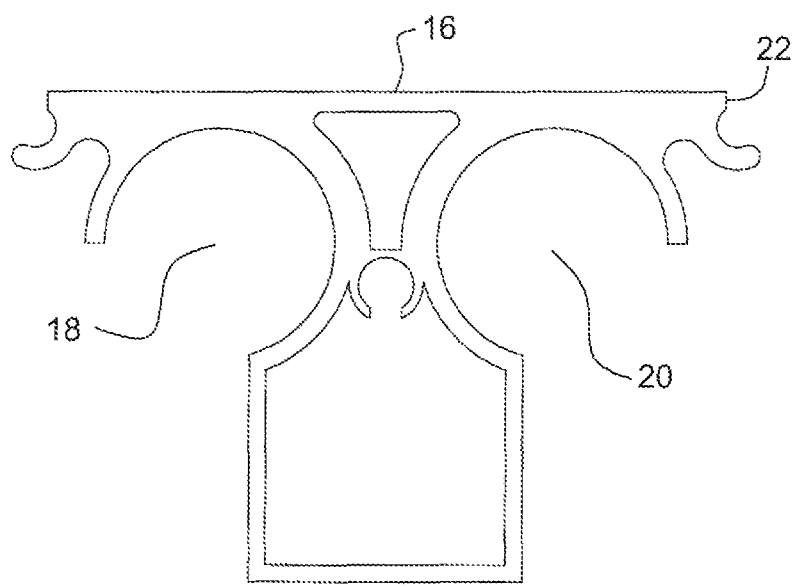
FIG. 2 illustrates the center section of the hinge assembly.
Figure 3:
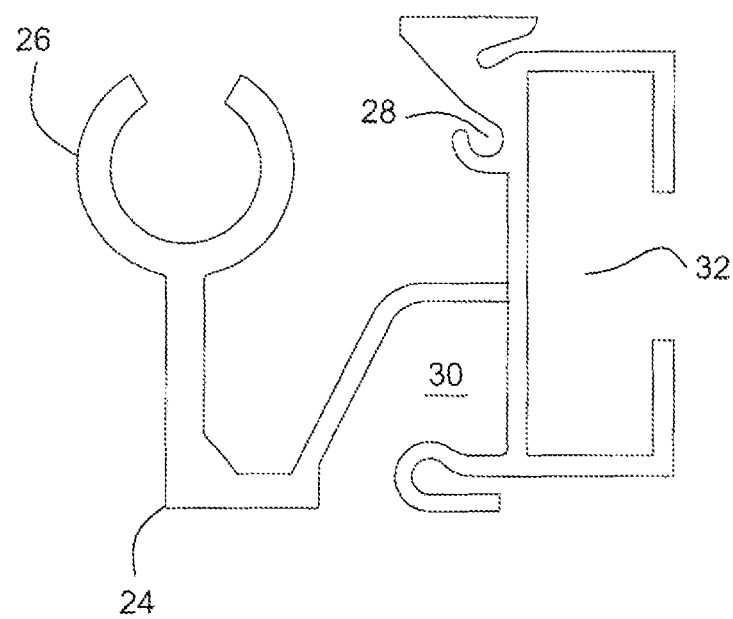
FIG. 3 illustrates the pivoting member of the hinge assembly.

In the interest of brevity, only one hinge assembly shall be described unless otherwise noted. In reference to FIG. 2, center hinge section 16 illustrates the base component of the primary hinge assembly. Center section 16 provides a circular hollow channel opening 18 and 20 which are designed to receive the pivoting hinge component 24 as illustrated in FIG. 3. Still in reference to FIG. 3, the pivoting hinge component incorporates a circular receiver 26 having a slightly smaller diameter. Coupling of the two members 16 to 24 require sliding the receiver 26 into receiving channels 18 or 20. Once the two members are coupled, they form a pivoting point and where the hinge assembly allows frame work 6 to open or close or allow the frame work and sectional cover panels to fold over on top of each other. Center section 16 also provides a leading edge surface 22 which provides a seal surface for the mating of a rubber gasket 34, used to prevent fluid leakage from entering into the cargo bed. The pivoting hinge component 24 provides a slot 28 for the mounting of a rubber gasket 34, used to create a seal between the center section 16 and the pivoting component 24.

Figure 4:
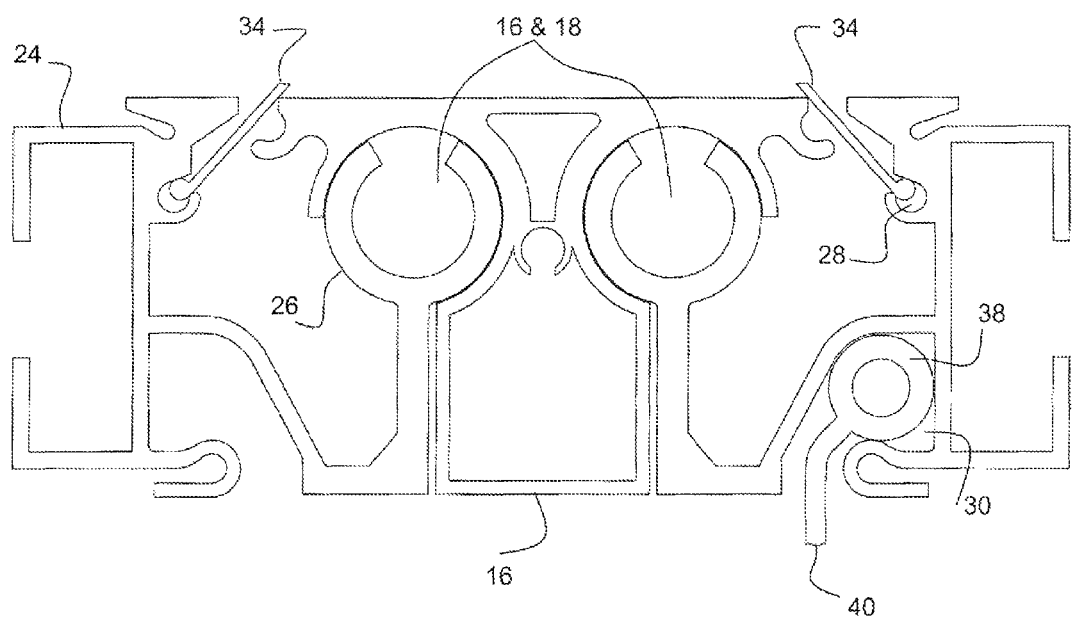
FIG. 4 is an exposed view of the center section and two pivoting members.

As referenced in FIG. 4, the rubber seal 34 compresses against the leading edge 22 of the center section 16 when the pivoting component 24 is in the closed position. Now in reference to FIG. 3, pivoting component 24 provides an open cavity 30 which is used for the mounting of a secondary hinge.

As illustrated in FIG. 4, isolation wall assembly 40 is dependent upon mounting into cavity opening 30 located within the pivoting component 24. The elliptical shape hinge base 38 is used to retain the placement of wall structure 40 within the hinge frame work and to allow back and forth movement of the wall structure.

Figure 5:
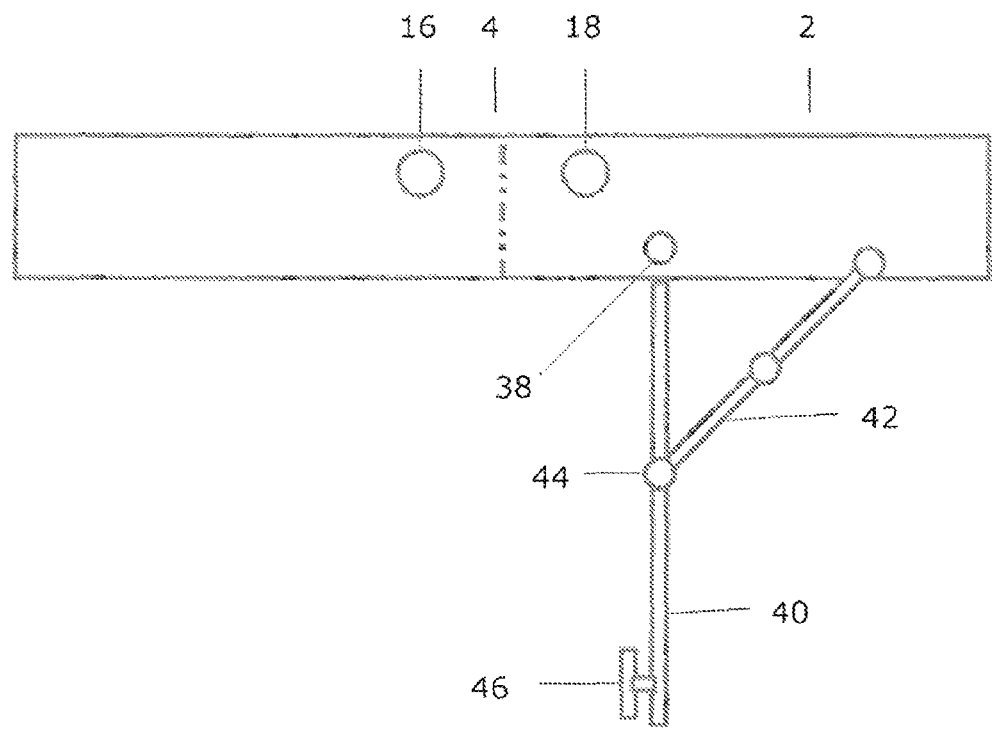
FIG. 5 illustrates the secondary hinge, isolation wall and locking bracket in an open position.

Now in reference to FIG. 5, isolation wall structure 40 is illustrated in an open position and is used to provide isolation space within the cargo bed. Wall structure 40 when in the open position is held in place by folding bracket 42. Folding bracket 42 is composed of 3 pivot points and where attachment connections are made to cover section 2 and with the opposing end attached to the wall structure. Center pivot point 44 locks in place to retain the wall structure in an open position or the wall 40 could be secured in place by a series of detachable straps attached to the wall structure and to the cargo bed. When the wall structure is not required it can be folded upwards into a hollowed section within the sectional cover and with the complete assembly held in place inside the sectional cover panel by a latching mechanism 46.

Figure 6:
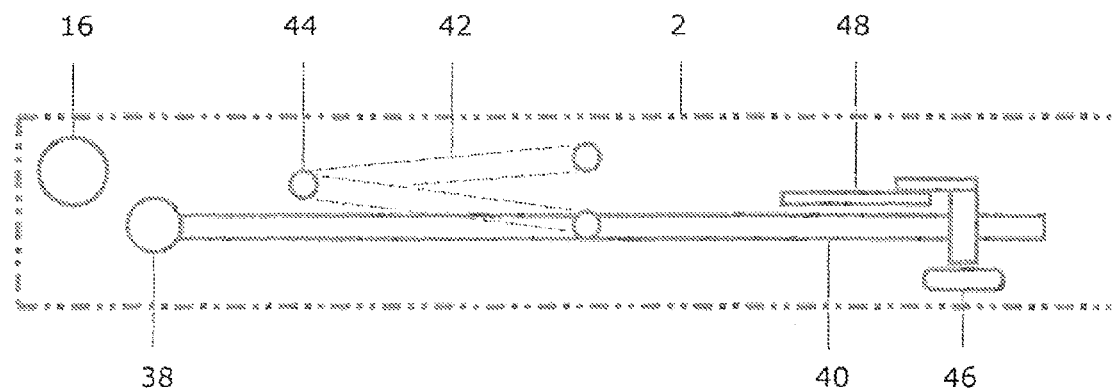
FIG. 6 illustrates the secondary hinge, isolation wall and locking bracket in a closed position.

In reference to FIG. 6, the wall structure 40 and the folding bracket 42 are illustrated in a closed position within the hollowed section of the sectional cover panel 2. Latching mechanism 46 is illustrated as a twist lock which engages a stop 48 spanning the distance across the individual cover panel 2. The latching mechanism can be configured in a variety of ways and could consist of a twist lock, push button latch or simply as disconnecting straps.

Figure 7:
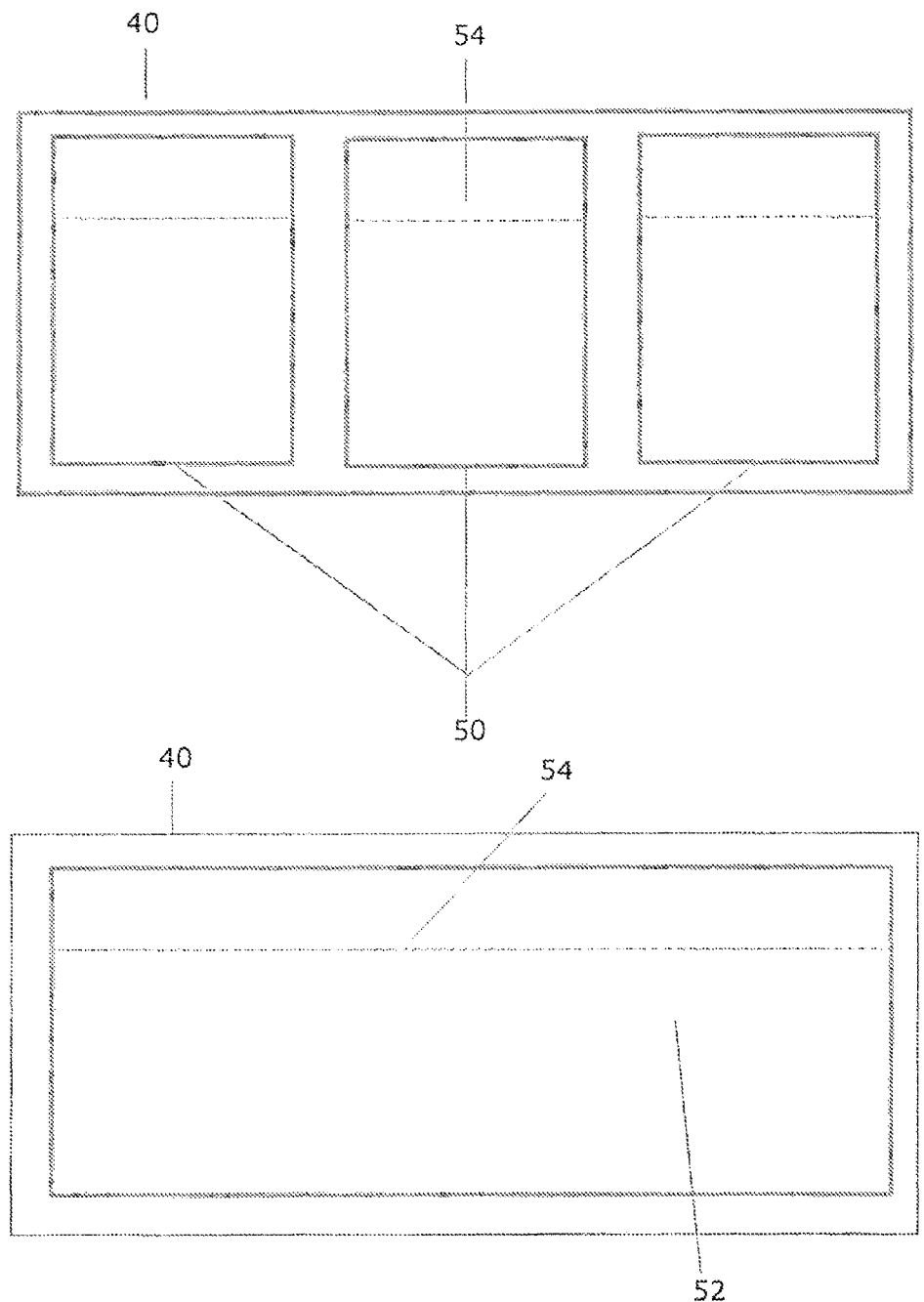
FIG. 7 illustrates the isolation wall having single or multiple attached compartments.

As illustrated in FIG. 7 the wall structure 40 could provide built in storage compartments 50 used in the storing of tools, emergency road side equipment or for other items easily loss or misplaced within the cargo bed. The storage compartments can be made of a solid material such as plastic or metal or constructed of a flexible material such as vinyl, fabric netting or canvas. A single or multiple of storage compartments, 50 and 52 can be incorporated as a removable attachment to the wall structure 40 or as a permanent fixture. The storage compartments could span the distance of the wall structure and with closure of the compartments using a zipper or VELCRO or could be sealed by locking straps.

The present disclosure is exemplary and therefore can vary in many ways and include a variety of components and configurations:

What is claimed:

1. A tonneau cover secondary frame hinge assembly for a pickup truck cargo bed, said secondary frame hinge assembly comprising a series of clamp-able sectional frame assemblies, said sectional frame assemblies being covered by sectional panels, which sectional panels are joined together by at least one primary pivoting hinge assembly, said pivoting hinge assembly comprising: a center base section comprising a hollow channel opening, sized and shaped to accept a smaller tubular receiver incorporated as part of a pivoting component, which pivoting component provides a pivoting action to an individual tonneau cover frame section to which said sectional cover panels are attached and wherein the center base section and pivoting component comprise an upward facing seal surface and where the pivoting component comprises a slot in a housing of the pivoting component for the mounting of an enlarged end of a rubber gasket, said rubber gasket projecting from the slot of the pivoting component to a position beyond the upwardly facing seal surface of the center base section for mating of the rubber gasket to the seal surface.

2. The tonneau cover hinge assembly according to claim 1, wherein the sectional cover panels comprise hollowed areas on an underside of the sectional panels.

3. The tonneau cover hinge assembly of claim 1, wherein an internal configuration of the hollow channel opening is a circular configuration.

4. A tonneau cover secondary frame hinge assembly for a pickup truck cargo bed, said secondary frame hinge assembly comprising a series of clamp-able sectional frame assemblies, said sectional frame assemblies being covered by sectional panels, which sectional panels are jointed together by at least one primary pivoting hinge assembly, said pivoting hinge assembly comprising: a center base section comprising a hollow channel opening, sized and shaped to accept a smaller tubular receiver incorporated as part of a pivoting component, which pivoting component provides a pivoting action to an individual tonneau cover frame section to which said sectional cover panels are attached, said pivoting component further comprising an open cavity to which is attached an isolation wall to subdivide a volume defined by the cargo bed.

5. The tonneau cover hinge assembly according to claim 4, the open cavity spans the distance across the cargo bed.

6. The tonneau cover hinge assembly according to claim 4, wherein the isolation wall comprises a mechanism to lock in place the isolation wall when the isolation wall is deployed in a downward position.

7. The tonneau cover hinge assembly according to claim 6, further comprising a latch to maintain the isolating wall section when folded upward into a hollowed area on a bottom side of the sectional covers.

8. The tonneau cover hinge assembly according to claim 4, wherein the isolating wall further comprises a single or a series of storage containers.

9. The tonneau cover hinge assembly according to claim 8, wherein the storage containers comprise at least one selected from the group consisting of fabric, netting, plastic and metal.

10. The tonneau cover hinge assembly according to claim 9, storage containers are removable from the isolating wall.

11. The tonneau cover hinge assembly of claim 8, further comprising at least one closure for the storage compartments selected from the group consisting of a zipper, hook and loop closures, and locking straps.

12. The tonneau cover hinge assembly of claim 6, wherein the latch is at least one selected from the group consisting of a twist lock, push buttom latch and disconnecting straps.

13. The tonneau cover hinge assembly of claim 4, wherein the isolation wall is one selected from the group consisting of a solid wall and a flexible wall.

\* \* \* \* \*